May 1, 1923.
J. R. LOWREY
HOSE CLAMPING TOOL
Filed May 16, 1922
1,453,940
2 Sheets-Sheet 1
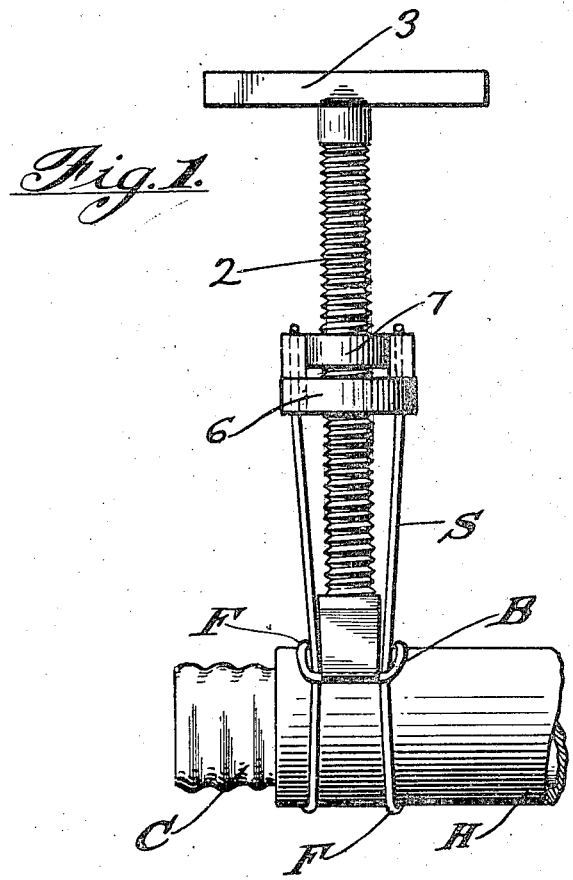
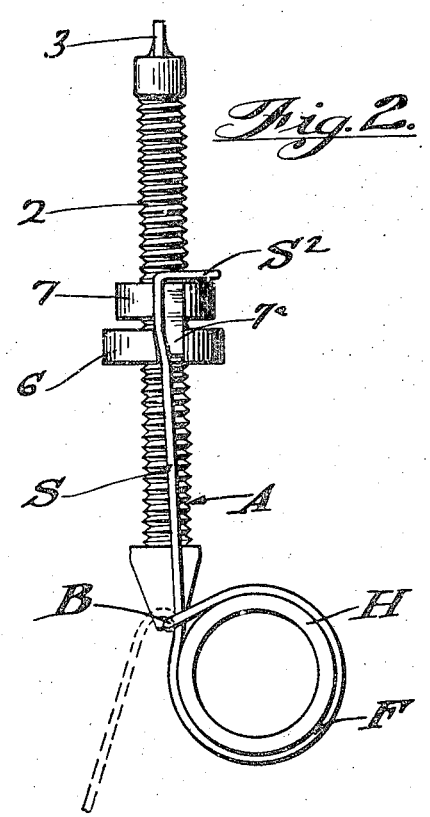
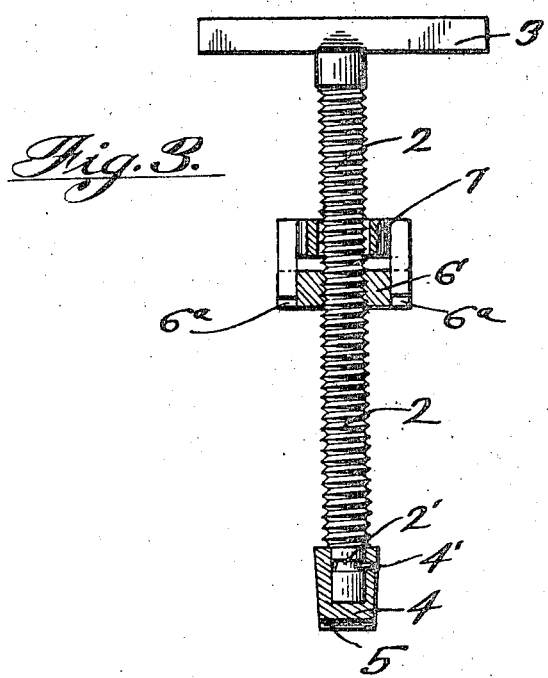
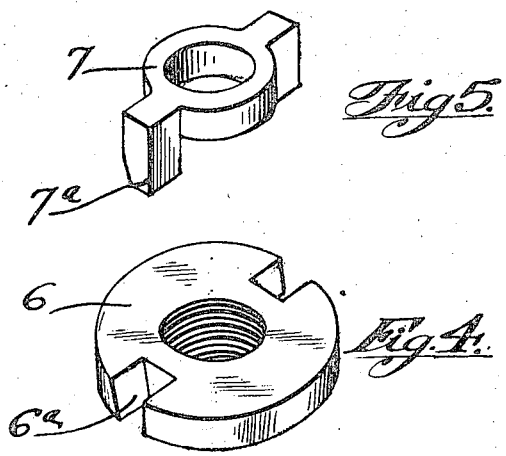
Inventor
JOHN R. LOWREY.
By Hazard & Miller
Attorneys.

May 1, 1923.
J. R. LOWREY
HOSE CLAMPING TOOL
Filed May 16, 1922
1,453,940
2 Sheets-Sheet 2
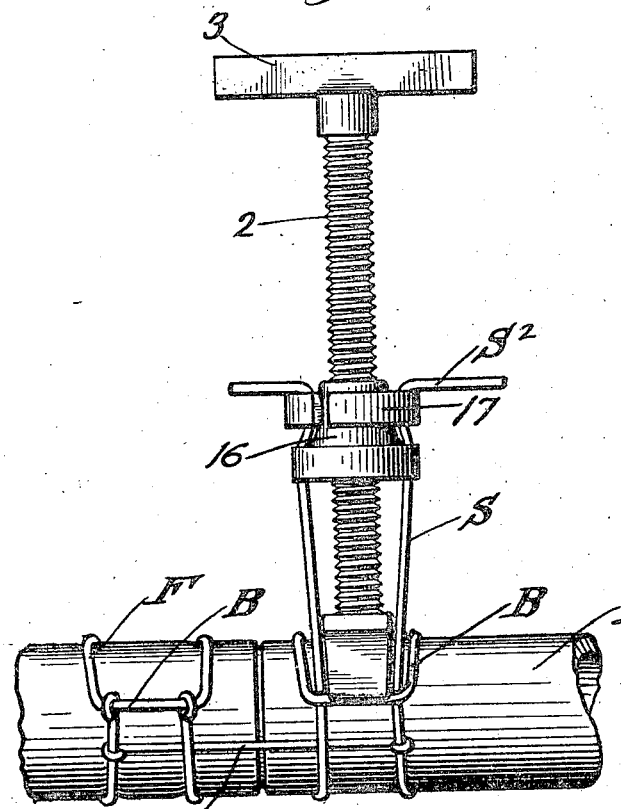
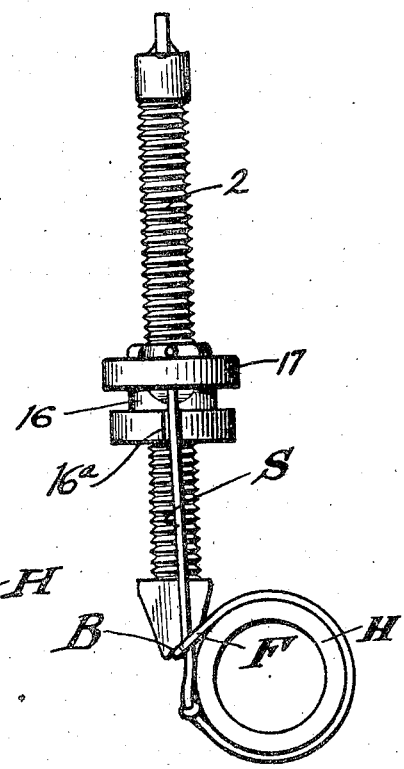
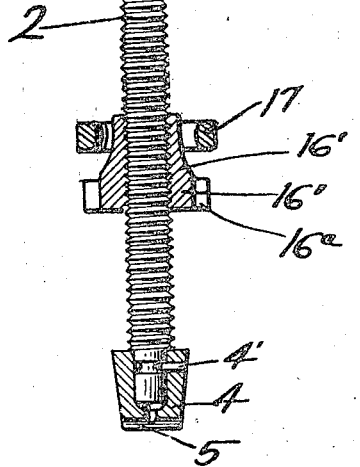

Patented May 1, 1923.

1,453,940

UNITED STATES PATENT OFFICE.

JOHN R. LOWREY, OF SAN PEDRO, CALIFORNIA, ASSIGNOR OF ONE-HALF TO JOHN A. S. ROGERS, OF SAN PEDRO, CALIFORNIA.

HOSE-CLAMPING TOOL.

Application filed May 16, 1922. Serial No. 561,294.

*To all whom it may concern:*

Be it known that I, JOHN R. LOWREY, a citizen of the United States, residing at San Pedro, in the county of Los Angeles and State of California, have invented new and useful Improvements in Hose-Clamping Tools, of which the following is a specification.

This invention relates to means for quickly and securely fastening wire hose binders in applied position upon hose ends while encompassing an inserted hose coupling. An object is to provide a tool of inexpensive and substantial character and of simple construction and whereby a piece of wire may be securely drawn tight around a hose end to fasten it to the hose coupling.

Other objects will be made manifest in the following specification of embodiments of the invention illustrated in the accompanying drawings, in which—

Figure 1 is a front elevation of the clamping tool as it is applied and ready for use.

Fig. 2 is a side elevation of the tool shown in Fig. 1.

Fig. 3 is a sectional detail view of the tool.

Fig. 4 is a perspective of the nut block.

Fig. 5 is a perspective of the upper jaw member.

Fig. 6 is a front elevation of a preferred form of the tool.

Fig. 7 is a side elevation of the device of Fig. 6.

Fig. 8 is a sectional detail view of the preferred form.

A simple and practical means for binding hose ends H in place upon an inserted bushing or coupling member C consists of a piece of wire of suitable dimension having a U-shaped bight B wrapped around the hose end with the shanks S of the bight extended within the cross bar of the bight as clearly shown in Figs. 1 and 2. It is desirable to draw the coil or fastening part F of the fastener tightly about the hose so as to clinch the same with a water tight fit on the coupling C.

My present invention consists of a tool for effectually clinching the binder or fastener F in place about the hose.

In Figs. 1 to 5 inclusive a form of the invention consists of a substantial threaded rod or screw 2 having a suitable handle 3 at one end and provided at its lower end with a presser foot 4 having a transverse groove 5 in its lower end face in which may seat a cross bar of the bight B, Figs. 1 and 2. Preferably the presser foot 4 has a swivelled attachment upon the lower end of the screw 2 which latter is provided with a circumferential groove 2' for receiving a pin 4' fixed in the presser foot 4 so that the latter can rotate, but be held against dislocation. Mounted upon the shank above the presser foot is a substantial nut or block 6 internally threaded complementary to the screw 2 and having on diametrically opposite sides upwardly extending grooves 6$^a$ to receive the upwardly extending shanks S of the hose binder or fastener F.

In use of the implement, the presser foot 4 is arranged so that the bar of the bight B engages in the slot 5 of the presser foot, and then the upwardly extending shanks S are passed up into the slots or grooves 6$^a$ in the block 6. After the shanks are placed in the slots, a second jaw member 7 is lowered down over the upper end portion of the block 6; the jaw 7 being shown as provided with legs 7$^a$ to fit the side grooves of the block 6. After the sliding jaw 7 has been thus disposed as shown in Figs. 1 and 2, the shanks S are bent transversely as at S$^2$. This method of supporting the bent portions of the shanks S provides for the substantial holding of the shanks between the block 6 and jaw 7.

After the shanks have been bent to the position shown in Fig. 2, the screw 2 is rotated so as to relatively pull the shanks S up through the bight B of the binder or fastener F, and the coiled portion of the binder is thus drawn tightly into the hose H to effect a water tight connection of the hose on the coupling C.

After the coils of the binder have been tensioned to the desired degree then the tool is bodily tilted in the direction of the arrow A, Fig. 2, with the presser foot resting on the bight bar B, the latter thus forming a fulcrum for the swinging tool. This action results in the binding of the shanks immediately around the bar as indicated by the dotted lines, Fig. 2, after which the shanks are severed close up to the bight B of the binder and thereafter remain in tight clamping position.

A slightly different form of the invention is shown in Figs. 6, 7 and 8, wherein the threaded block 16 has a circular flange 16' on its lower end which is slotted at 16ᵃ at diametrically opposite portions. The body 16 has upwardly convergent portions so that the shanks S of the wire can be pinched inwardly as shown in Fig. 6 after which the upper holding jaw 17 is lowered down over the upper end of the sleeve 16 and then the shank ends are bent outwardly over the top of the ring like member 17.

In Fig. 6 there is shown to the left a completed binder or fastener F with the ends of the shanks cut off at the cross bar of the bight B. The two binders on the contiguous hose ends may be connected together against axial separation as by the use of a tie bar T, Fig. 6.

If desired the clamp ring 17 may be of split form as shown in Fig. 6, so that the wires can be inserted or removed through the open side of the ring.

Various modifications and changes may be resorted to within the spirit of the invention as claimed.

What is claimed is:

1. A tool for clinching wire hose binders in place on hose ends, said tool consisting of a threaded shank having a presser foot at one end adapted to pivot upon a cross-bar of a bight of the wire binder, and means mounted on the screw shank for holding shanks of the binder while the binder coils are tensioned about the hose, said means consisting of a nut having slots in its sides and a ring fitting over the nut and between which the binder shanks are adapted to be held.

2. A tool for clinching wire hose binders in place on hose ends, said tool consisting of a threaded shank having a presser foot at one end adapted to pivot upon a cross-bar of a bight of the wire binder, and means mounted on the screw shank for holding shanks of the binder while the binder coils are tensioned about the hose, said means consisting of a nut block and a ring forming complementary jaws between which the binder shanks are adapted to be held, the said jaws having gripping faces on which portions of the shanks of wire may be laid.

3. A wire hose binder tightening tool comprising a screw shank, a presser foot swivelled on one end of the shank and a handle on the other, a nut member threaded on the shank and having wire receiving slots, and a ring for adjustment upon the nut and adapted to hold portions of wire laid along the nut so as to place the wire shanks of the binder under tension to contract the binder about the hose.

4. A wire hose binder tightening tool comprising a screw shank, a presser foot swivelled on one end of the shank and a handle on the other, a nut member threaded on the shank and having wire receiving slots, and a ring for adjustment upon the nut and adapted to hold portions of wire laid upon the nut so as to place the wire shanks of the binder under tension to contract the binder about the hose, said presser foot being constructed and arranged to pivot on a part of the binder as the tool is swung to a wire bending position with respect to the bight of the binder.

In testimony whereof I have signed my name to this specification.

JOHN R. LOWREY.